Jan. 8, 1935.  C. A. MILLER  1,987,265
PORTABLE POWER PLANT AND VEHICLE THEREFOR
Filed Dec. 29, 1932  4 Sheets-Sheet 1
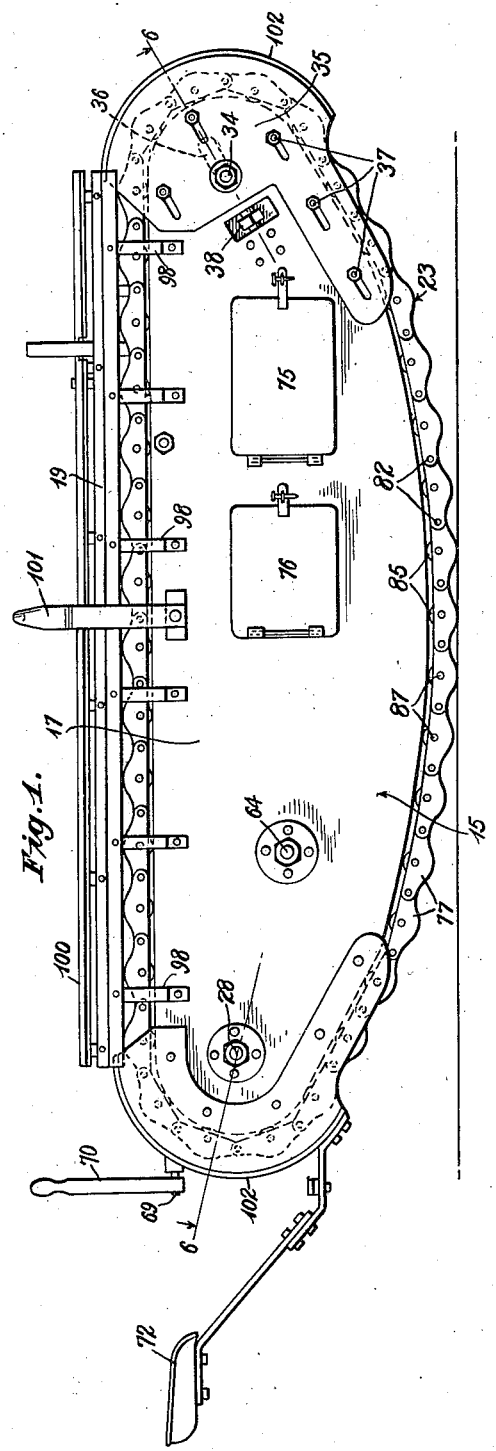
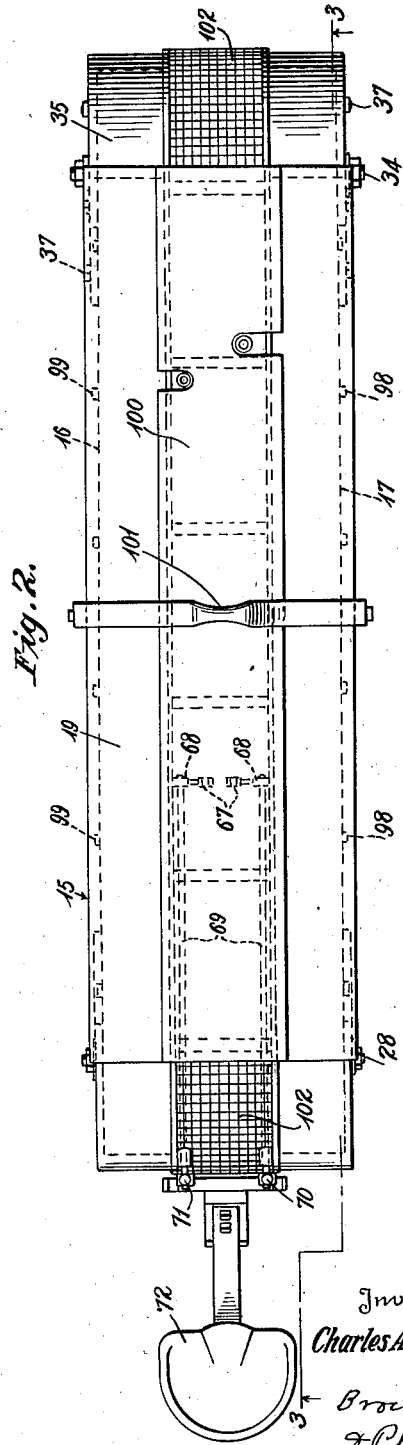
Inventor
Charles A. Miller
By Brown & Phelps
Attorneys Jan. 8, 1935. C. A. MILLER 1,987,265
PORTABLE POWER PLANT AND VEHICLE THEREFOR
Filed Dec. 29, 1932  4 Sheets-Sheet 2
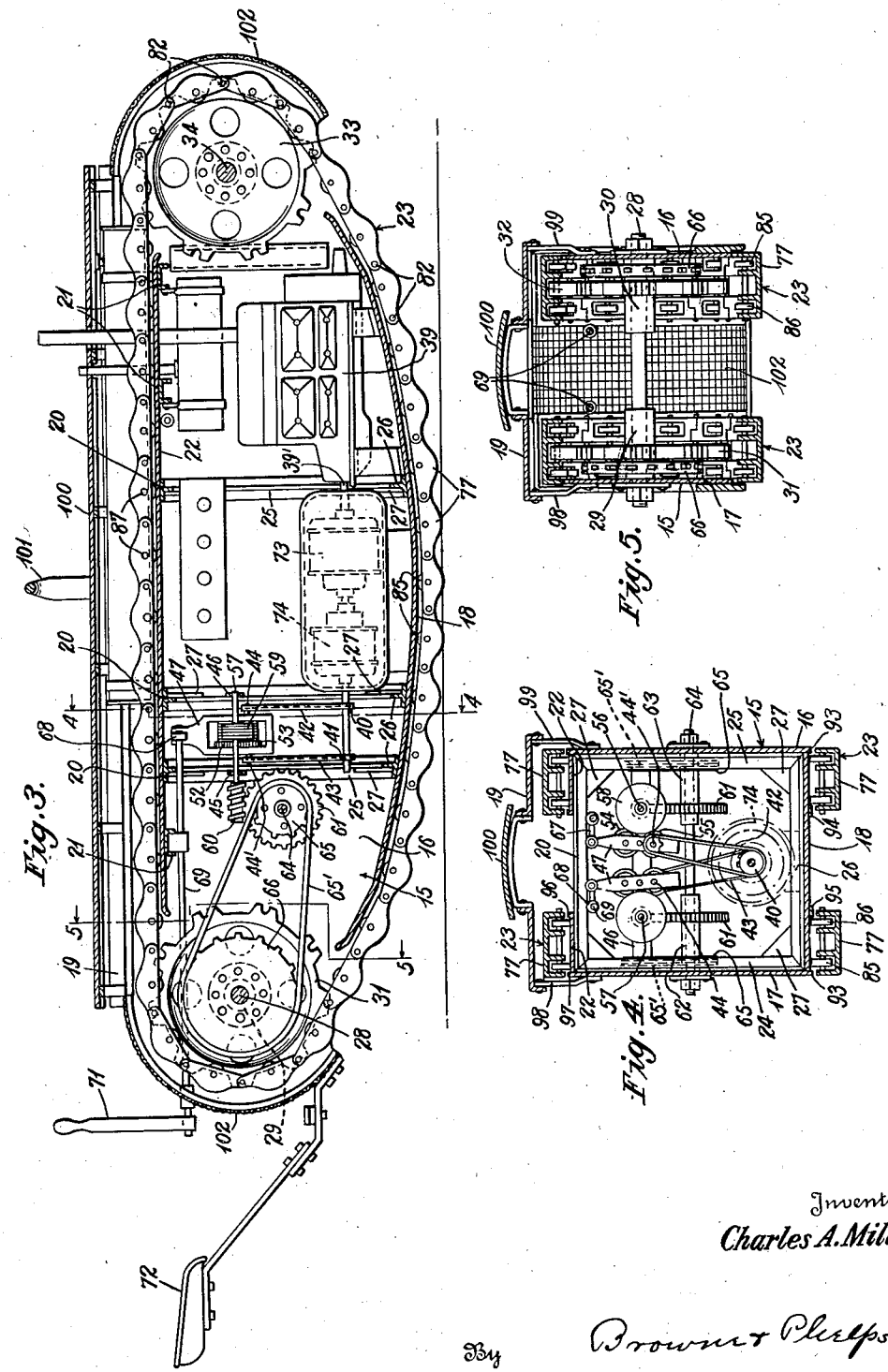
Inventor
Charles A. Miller
By Brown & Phelps
Attorneys Jan. 8, 1935.  C. A. MILLER  1,987,265
PORTABLE POWER PLANT AND VEHICLE THEREFOR
Filed Dec. 29, 1932  4 Sheets-Sheet 3
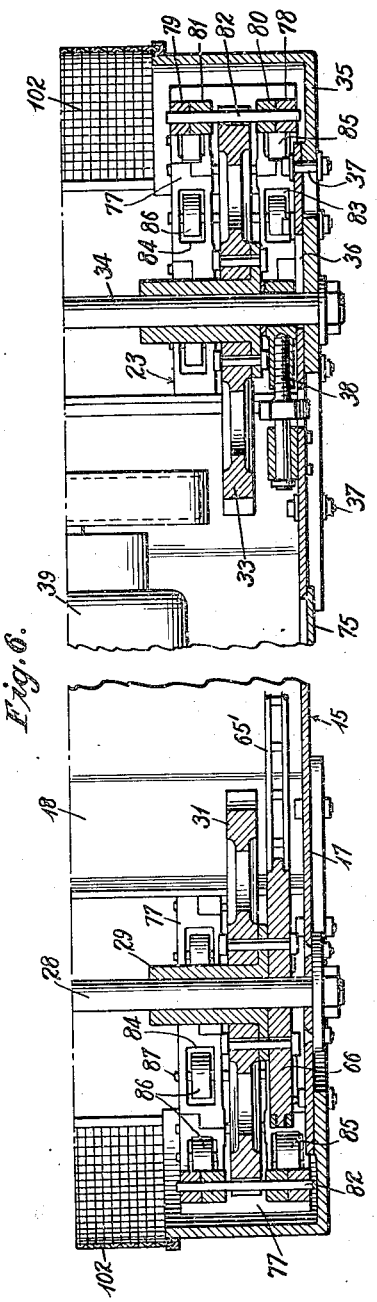
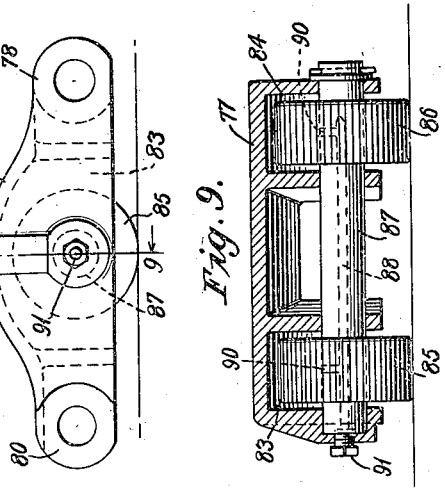
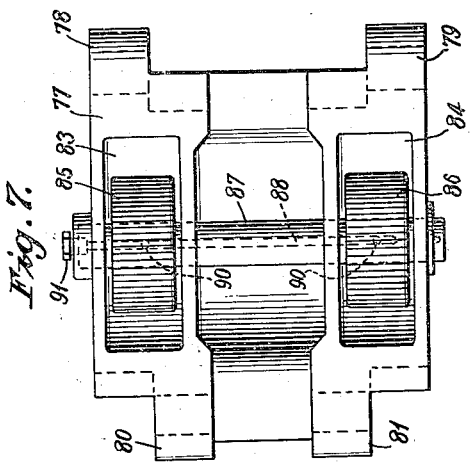
Inventor
*Charles A. Miller*
By *Brown & Phelps*
  Attorneys Jan. 8, 1935.  C. A. MILLER  1,987,265
PORTABLE POWER PLANT AND VEHICLE THEREFOR
Filed Dec. 29, 1932  4 Sheets—Sheet 4
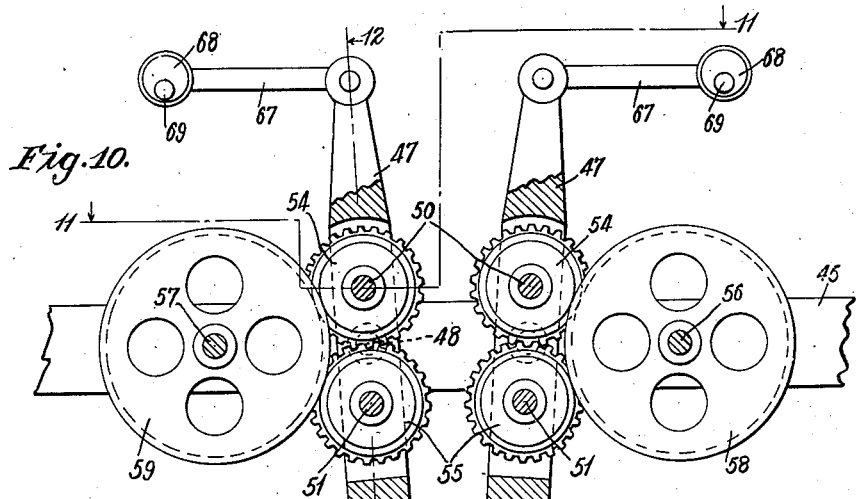
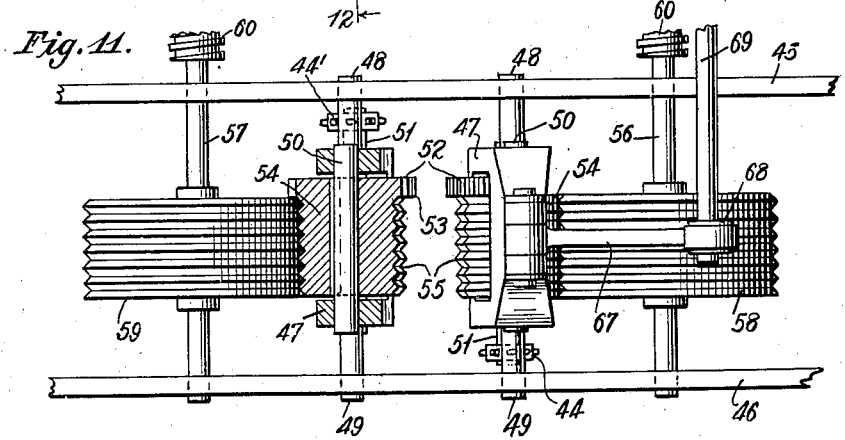
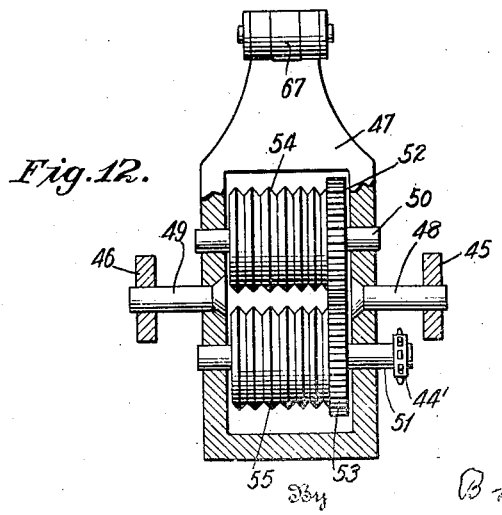
Inventor
Charles A. Miller
By Brown & Phelps
Attorneys Patented Jan. 8, 1935

1,987,265

UNITED STATES PATENT OFFICE 1,987,265

PORTABLE POWER PLANT AND VEHICLE THEREFOR

Charles A. Miller, Weatherly, Pa.

Application December 29, 1932, Serial No. 649,429

10 Claims. (Cl. 180—9.1)

The invention relates to tractor-carried portable power plants and has as an object the provision of a self-contained power plant that may be used particularly upon railways in connection with track work.

It is an object of the invention to provide a self-contained power plant housed in the frame of a vehicle in small compass whereby it may be operated between the tracks of a two-track railway without interruption with the passage of trains.

It is a further object of the invention to provide a tractor for transporting the power plant which has great maneuverability whereby it may be moved along or over the tracks of a railway in the carrying out of work on the right of way.

It is a further object of the invention to provide a tractor that may be turned upon its central vertical axis as a pivot, thereby very greatly improving its maneuverability.

It is a further object of the invention to improve upon the details of devices of this character.

Further objects of the invention will appear from the following description when read in connection with the accompanying drawings showing an illustrative embodiment of the invention, and wherein:—

Fig. 1 is a side elevation;

Fig. 2 is a plan view;

Fig. 3 is a vertical section on line 3—3 of Fig. 2;

Figs. 4 and 5 are vertical transverse sections on the corresponding section lines of Fig. 3;

Fig. 6 is a detail horizontal section partly broken away on broken line 6—6 of Fig. 1 drawn on an enlarged scale;

Fig. 7 is a plan view and

Fig. 8 is a side elevation of one link of the chain;

Fig. 9 is a vertical section on line 9—9 of Fig. 8;

Fig. 10 is a detail side elevation of a friction drive means adapted for reversing the direction of drive;

Fig. 11 is a section on line 11—11 of Fig. 10; and

Fig. 12 is a transverse section on line 12—12 of Fig. 11.

As shown the device comprises a housing 15 comprising side plates 16, 17, a bottom plate 18, and a cover 19. The upper edges of the side plates 16, 17 are shown as connected by transverse members 20, 21 shown as supporting shoes 22 upon which the chains 23 travel along the top of the housing.

If desired and if the plates 16, 17, 18 are sufficiently heavy, these plates with the members 20, 21, 22 may form the entire housing for the tractor and power plant but for purposes of stiffness it is preferred to continue the members 20 to form complete frames by addition of the vertical members 24, 25 and bottom cross members 26 with gusset plates 27 provided at the angles where the frame members meet. Three frames of this character are indicated in Fig. 3 of the drawings so placed that the machines of the power plant are not interfered with.

To drive the chains 23, one of which is provided at each side of the vehicle, there is shown a shaft 28 journalled in the side plates 16, 17, in the projection of the side plates beyond plates 18 and 22, upon which shaft are mounted hubs 29, 30 carrying the sprocket wheels 31, 32. The chains also pass about sprocket wheels 33 at the front end of the device, which wheels are idle upon a shaft 34 journalled in movable guard plates 35. To adjust the chain for wear, the shaft 34 is shown as passing through slots 36 in the side plates 16, 17 and the guard plates 35 are supported upon bolts 37 projecting from the plates 16, 17. To adjust the tightness of the chains, the nuts upon the bolts 37 may be loosened upon both sides of the device and the adjusting screws 38 may be manipulated to force the shaft 34 forwardly in the slots 36, the plates 35 partaking in its movement, after which the nuts upon the bolts 37 may be tightened to take the strain upon the chain.

To drive the chains, there is shown an internal combustion motor 39 with its shaft 39' extended and equipped with sprockets 40, 41 driving chains 42, 43 passing about sprockets 44, 44' to drive the mechanism shown in Figs. 10, 11, and 12. The mechanism there shown comprises a pair of drive means one for each of the sprocket wheels 31, 32. The said drive means are shown as carried between frame members 45, 46 extending between the uprights 24, 25 upon one of the frames.

As shown in Figs. 10 to 12 inclusive, the drive means comprise yoke members 47 pivoted upon stub shafts 48, 49 fixed in the cross members 45, 46. Journalled in said yoke are shafts 50, 51, one of which is extended to receive the sprocket wheel 44, the shafts 50, 51 carrying meshing gears 52, 53 and serrated friction drums 54, 55.

Also journalled in the cross members 45, 46 are shafts 56, 57 carrying serrated drums 58, 59 with serrations complemental to those upon the drums 54, 55. Movement of the yokes 47 about the pivots 48, 49 will cause one of the drums 54, 55 to be placed into engagement with a drum 58 or 59 and the other thereof to be out of engagement, while an opposite movement of a yoke 47 will reverse the engagement thereby reversing the motion of revolution of a drum 58 or 59. An intermediate position of a yoke 47 will place both of its drums 54 and 55 out of engagement with the corresponding drum 58 or 59.

The shafts 56, 57 are shown as provided with worm gears 60, each in mesh with a worm wheel 61 mounted upon tubular members 62, 63, revolving upon a shaft 64 journalled in the side plates 16, 17. Also carried by the tubular members 62, 63 are sprockets 65 driving the chain sprockets 31, 32 by means of chains 65' and sprocket wheels 66 carried by the hubs 29.

To manipulate the yokes 47 as shown in Fig. 10, links 67 are connected to the top of the yokes at one end and at the remaining end are provided with an eccentric control 68 which may be adjusted by means of shafts 69 under control of hand levers 70, 71 within reach of a driver riding upon seat 72. Thus by movement of hand lever 70, 71, the device may be driven forward, backward, or may be caused to turn, or by a forward movement of one chain and a rearward movement of the opposite chain, the device may be turned upon a central pivot.

In use the device is designed for a variety of purposes.

As shown it is equipped with two generators 73, 74 and with switchboard equipment not shown accessible through the doors 75, 76 shown in Fig. 1. The generator 73 may be designed to provide welding current for welding rails and the generator 74 to provide current for operation of electrically driven tools and grinders.

It is also contemplated to equip the device with an air compressor plant whereby it may be used to operate tampers, chisels, or like percussive tools.

In present practice when air tamping of railway ballast is to be carried out, it is necessary to lay lines of piping from an air compressor plant upon the siding in order to serve a length of track and to extend the piping or move the plant in accordance with the requirements of service, whereas by the present invention the compressing plant may move along the shoulder of the railway or between the tracks thereof to supply the compressed air without interference with the passage of trains.

The chain which it is preferred to use and shown in Figs. 7, 8, and 9 comprises a casting 77 having spaced eyes 78, 79 at one end and eyes 80, 81 at the opposite end carried by lugs which project between the eyes 78, 79 for receipt of connecting pins 82, which pins as shown in Fig. 3 are adapted to be engaged by the sprockets 31, 32, and 33. Also the casting is shown as formed with recesses 83, 84 receiving rollers 85, 86 journalled upon a shaft 87 mounted in the casting 77, the shaft 87 preferably being bored as indicated at 88, 90 for conducting lubricant which may be introduced through a fitting 91 to lubricate the rollers.

As indicated in Fig. 4, the side plates 16, 17 are shown as projecting at 93 to form guides for the rollers 85, 86 and guides for the opposite side of the rollers are provided by means of straps 94, 95. The plates 22 are likewise provided with guide ridges 96, 97.

The cover 19 is shown as carried by means of brackets 98, 99 with a central elevated portion 100 thus providing openings for ventilation of the interior of the housing and yet protecting the mechanism from the weather. The shoes 22 form a portion of the housing 15.

To lift the device by means of a crane for the purpose of loading or unloading the same from a freight car, there is shown a sling member 101 secured to the housing at its center of gravity.

The space between the sprockets 31, 32 at one end of the device and 33 at the remaining end may be left open and provided with gratings 102 for the purpose of additional ventilation.

As constructed for use the device has dimensions substantially as follows: width thirty inches, height forty-four inches, and length eleven feet, with a low center of gravity by virtue of placing the beds of the machinery upon the bottom plate below and in contact with which plate the caterpillar chains slide. The curvature of the bottom plate very greatly improves maneuverability.

Minor changes may be made in the physical embodiment of the invention within the scope of the appended claims without departing from the spirit thereof.

I claim:

1. A vehicle comprising, in combination: a box frame including top, side and bottom plates; sprockets mounted between the ends of the side plates; a pair of traction chains passing about said sprockets and sliding upon the exterior of said top and bottom plates; power generating means housed in said frame; a shaft driven by said means; and mechanical means driven by said shaft to drive either or both of said chains independently in either direction at will of the operator.

2. A vehicle comprising, in combination: a box frame comprising a top plate, side plates having longitudinally convex lower edges, a bottom plate upwardly curved toward its ends to fit the lower edges of the side plates and terminating short of the ends of the side plates, sprockets mounted between the projecting ends of the side plates; traction chains passing about said sprockets and sliding on the exterior of the top and bottom plates; power means housed in said frame; and means to drive the sprockets and chains from said power means.

3. A vehicle comprising, in combination: a box frame comprising top and bottom plates; side plates projecting at their ends beyond the ends of the top and bottom plates, each plate connected to the adjacent plate of the frame at the edges thereof, traction chain drive sprockets journalled in the side plates at one end of the frame, idling sprockets freely revoluble upon a shaft mounted between the opposite ends of the side plates and passing through elongated slots in said plates, an adjustment plate adjustably secured to a surface of each of said last named plates, said shaft fixed in said adjustment plates, and means to cause movement of said shaft in said first named slots for tightening of the traction chain passing about said sprockets.

4. A frame comprising, side plates extending at their ends in spaced relation and having elongated slots; supplemental plates bolted to said spaced portions, the bolts passing through elongated slots in one of said plates for adjustment of the supplemental plates, a shaft fixed in said supplemental plates and passing through said first named slots; guard shells connected at their edges to an edge of each of said supplemental plate, and projecting toward the remaining plate whereby to provide a housing for a tractor chain.

5. A self-propelled power plant of dimensions adapting the same to railway track service and to travel between the tracks of a double track system with free passage of trains thereover comprising, in combination: a frame; a power plant housed therein; a pair of traction chains each mounted to travel upon the exterior of the top and bottom of said frame; said power plant comprising track-servicing power generating means and means to selectively drive said chains from said power plant to steer the device while propelling the same forwardly or in reverse.

6. A self-propelled power plant of dimensions adapting the same to railway track service and to travel between the tracks of a double track system with free passage of trains thereover comprising, in combination: a frame; a power plant housed therein; a pair of traction chains each mounted to travel upon the exterior of the top and bottom of said frame; said power plant comprising track-servicing power generating means and means to drive said chains from said power plant independently in either direction at the will of the operator.

7. A self-propelled power plant of dimensions adapting the same to railway track service and to travel between the tracks of a double track system with free passage of trains thereover comprising, in combination: a frame; a power plant housed in said frame; power take-off connections accessible through a side of said frame; a pair of traction chains mounted to travel upon and about the exterior of the top and bottom of said frame; said plant comprising track-servicing power generating means associated with said take-off connections; and means to drive said chains from said power plant independently in either direction at the will of the operator.

8. A self-propelled power plant of dimensions adapting the same to railway track service and to travel between the tracks of a double track system with free passage of trains thereover comprising, in combination: a frame; a power plant housed in said frame, comprising an internal combustion motor and accessories, and a welding current electric generator; a control board and power take-off connections mounted in said frame accessible from the exterior of a side thereof and connected to said generator; a pair of traction chains mounted to travel upon and about the exterior of the top and bottom of said frame; and means to drive each of said chains from said motor independently in either direction at the will of the operator.

9. A self-propelled power plant of dimensions adapting the same to railway track service and to travel between the tracks of a double track system with free passage of trains thereover comprising, in combination: a frame; a power plant housed in said frame, comprising an internal combustion motor and accessories, a welding current electric generator and a power tool current electric generator; a control board and power take-off connections mounted in said frame, accessible from the exterior of a side thereof and connected to said generators; a pair of traction chains mounted to travel upon and about the exterior of the top and bottom of the frame; and means to drive each of said chains independently from said motor in either direction at the will of the operator.

10. A vehicle comprising, in combination: a vehicle body including side, top and bottom members interconnected adjacent their longitudinal edges to provide a box frame; sprockets mounted at the ends of the side members; a pair of traction chains passing about said sprockets and sliding upon the exterior of said top and bottom members; power generating means housed in said body; a shaft driven by said means; and mechanical means driven by said shaft to drive either or both of said chains in either direction at will of the operator.

CHARLES A. MILLER.